United States Patent
Hulsebos et al.

(10) Patent No.: US 6,481,755 B2
(45) Date of Patent: *Nov. 19, 2002

(54) COUPLING DEVICE AND METHOD FOR FABRICATING A GRIP RING TO BE USED IN SUCH A COUPLING DEVICE

(75) Inventors: Michel Paul Hulsebos, Deventer; Dries Nijsen, Enschede, both of (NL)

(73) Assignee: Georg Fischer Waga N.V., Pa Epe (NL)

( * ) Notice: Subject to any disclaimer, the term of this patent is extended or adjusted under 35 U.S.C. 154(b) by 109 days.

This patent is subject to a terminal disclaimer.

(21) Appl. No.: 09/820,558

(22) Filed: Mar. 28, 2001

(65) Prior Publication Data

US 2001/0010425 A1 Aug. 2, 2001

Related U.S. Application Data

(63) Continuation of application No. 09/360,983, filed on Jul. 26, 1999, now Pat. No. 6,279,963, and a continuation of application No. 08/790,146, filed on Jan. 28, 1997, now Pat. No. 6,257,628.

(30) Foreign Application Priority Data

Mar. 4, 1996 (NL) .............................. 1002514
Jul. 24, 1998 (NL) .............................. 1009734

(51) Int. Cl.$^7$ .......................... F16L 21/04; F16L 21/08
(52) U.S. Cl. ................. 285/104; 285/105; 285/340; 285/328
(58) Field of Search ........................ 285/104, 105, 285/340, 328, 231

(56) References Cited

U.S. PATENT DOCUMENTS

| | | | |
|---|---|---|---|
| 2,201,372 A | 5/1940 | Miller | 285/105 |
| 2,230,725 A | 2/1941 | Nathan | 285/340 |
| 3,288,497 A | 11/1966 | Nydam | 285/138 |
| 3,486,772 A | 12/1969 | Elsner | 285/96 |
| 3,582,112 A | 6/1971 | Pico | 285/105 |
| 3,860,270 A | 1/1975 | Arnold | 285/93 |
| 4,119,335 A | 10/1978 | Rieffle et al. | 285/337 |
| 4,150,848 A | 4/1979 | Dyrup | 285/328 |
| 4,630,848 A | 12/1986 | Twist et al. | 285/340 |
| 4,676,531 A | 6/1987 | Martin | 285/96 |
| 4,842,306 A | 6/1989 | Zeidler et al. | 285/104 |
| 4,886,304 A | 12/1989 | Kunsman | 285/328 |
| 4,898,407 A | 2/1990 | Zeidler | 285/328 |
| 5,037,144 A | 8/1991 | Peting et al. | 285/321 |
| 5,067,751 A | 11/1991 | Walworth et al. | 285/105 |
| 5,188,401 A | 2/1993 | Staniforth | 285/322 |
| 5,234,234 A | 8/1993 | Hearn | 285/328 |
| 5,314,213 A | 5/1994 | Heister et al. | 285/231 |
| 5,350,204 A | 9/1994 | Henniger | 285/323 |
| 5,360,218 A | 11/1994 | Percebois et al. | 285/104 |
| 5,476,292 A | 12/1995 | Harper | 285/337 |
| 5,911,447 A | 6/1999 | Ball | 285/105 |

FOREIGN PATENT DOCUMENTS

| | | | |
|---|---|---|---|
| CA | 673408 | 11/1963 | 285/340 |
| CH | 0229917 | 2/1944 | 285/340 |
| CH | 664 813 | 3/1988 | |
| DE | 24 30 248 | 1/1976 | |
| DE | 27 31 464 | 3/1978 | 285/105 |
| DE | 28 36 557 | 3/1980 | 285/105 |
| DE | 36 31 547 | 4/1988 | 285/340 |
| DE | 42 19 722 | 12/1993 | 285/341 |
| DE | 198 23 181 | 10/1999 | |
| EP | 0 418 961 | 3/1991 | |
| EP | 0 670 447 | 9/1995 | 285/105 |
| EP | 0 738 850 | 10/1996 | |
| EP | 0 794 378 | 9/1997 | |
| FR | 2072296 | 9/1971 | |
| FR | 2 369 495 | 5/1978 | |
| GB | 218743 | 10/1985 | 285/340 |
| JP | 404107384 | 4/1992 | 285/340 |
| NL | 63780 | 4/1934 | |
| WO | WO 94/02770 | 2/1994 | |

*Primary Examiner*—Eric K. Nicholson
(74) *Attorney, Agent, or Firm*—Darby & Darby

(57) ABSTRACT

Coupling device for a pipe, comprising a sleeve having an insert end for the pipe and a sealing means adapted for realizing a seal around the pipe when inserted in the sleeve, said sealing means comprising a plurality of mutually slidable elements which together form a ring, and a grip ring being mounted within said elements and extending along at least a part of the perimeter of the pipe, the grip ring being formed with dents pressed out of the plane of the grip ring.

5 Claims, 2 Drawing Sheets

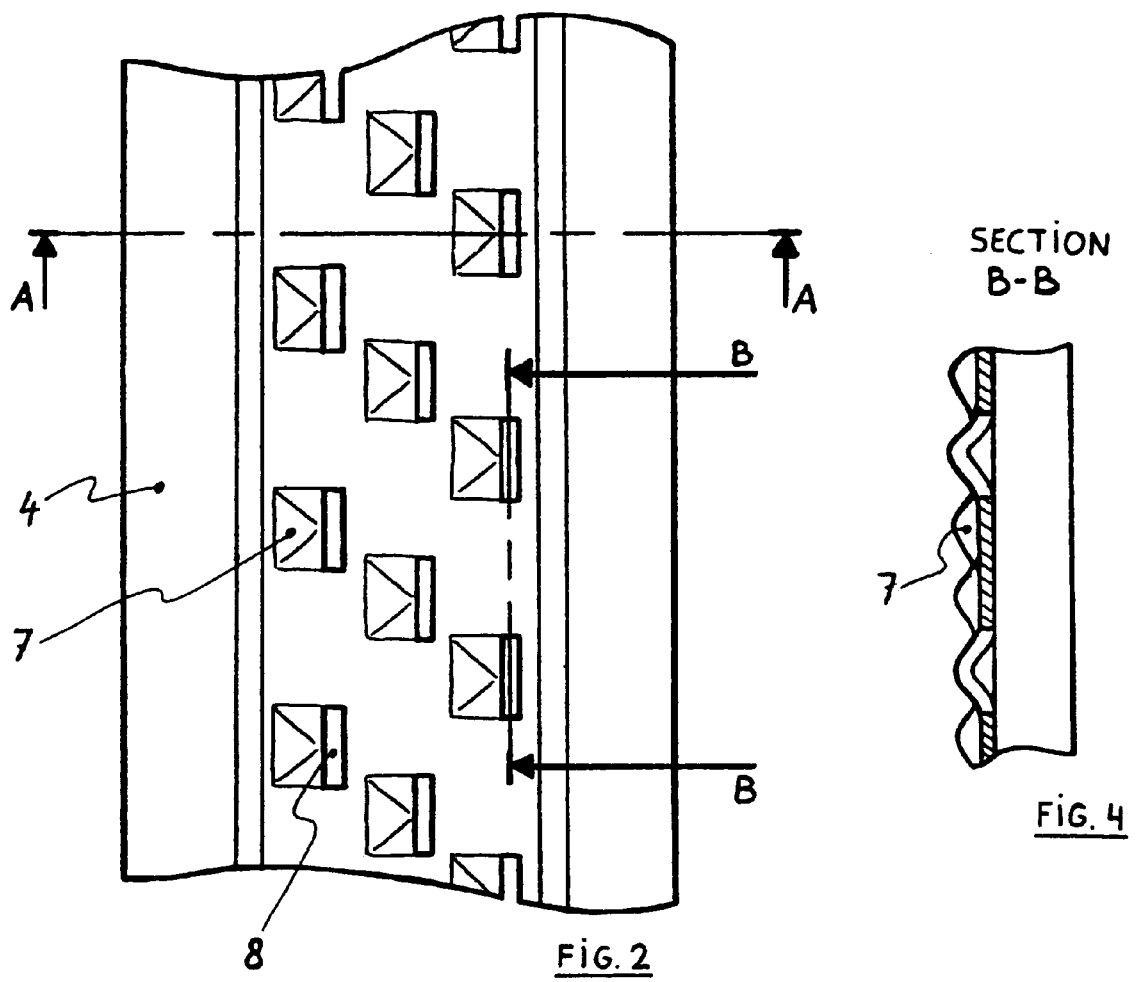
FIG. 2
SECTION B-B
FIG. 4
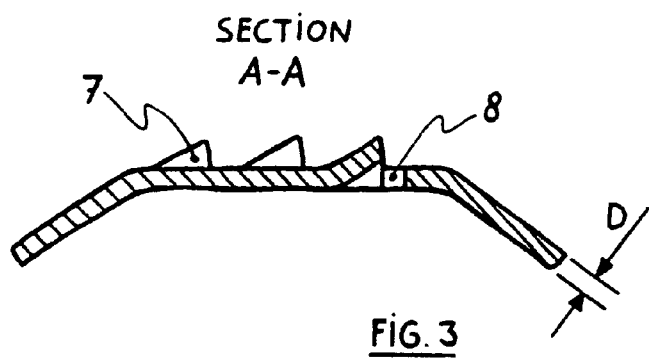
SECTION A-A
FIG. 3

COUPLING DEVICE AND METHOD FOR FABRICATING A GRIP RING TO BE USED IN SUCH A COUPLING DEVICE

This is a continuation of Ser. No. 08/790,146, filed Jan. 28, 1997, now U.S. Pat. No. 6,257,628 issued Jul. 10, 2001, and Ser. No. 09/360,983, filed Jul. 26, 1999, now U.S. Pat. No. 6,279,963 issued on Aug. 28, 2001, which are incorporated by reference in their entirety.

FIELD OF THE INVENTION

The invention relates to a coupling device for a pipe, comprising a sleeve having an insert end for the pipe and a sealing means adapted for realizing a seal around the pipe when inserted in the sleeve, said sealing means comprising a plurality of mutually slidable elements which together form a ring, and a grip ring being mounted within said elements and extending along at least a part of the perimeter of the pipe.

BACKGROUND OF THE INVENTION

Such a coupling device is disclosed in the European patent application EP-A-0 794 378, to which U.S. application Ser. No. 08/790,196 corresponds, which has been incorporated by reference, and assigned to the present applicant's assignee. The coupling device may be used for pipes made of steel, stainless steel, etemite, cast-iron, coated steel, PVC, polyethylene and asbestos cement, and may be used to couple two of such pipes. It is important that on the one hand the coupling device provides a sufficient seal, and that on the other hand the coupling device is able to withstand tensile strain. The latter function is provided by the grip ring which is part of the prior art coupling device.

SUMMARY OF THE INVENTION

It is the objective of the invention to improve the function of said grip ring. Said objective is achieved by the inventive coupling device being characterized in that the grip ring is provided with dents pressed out of the plane of the grip ring.

It is particularly desirable that the dents which are pressed out of the plane of the grip ring are adjacent to slit-like openings punched out of the grip ring. It has been shown that the resistance to tensile strain of the coupling device according to the invention is thereby considerably improved with respect to the coupling device of EP-A-0 794 378. Employment of such a coupling device with hard pipes like pipes of cast-iron, steel, stainless steel and the like, having a diameter of 150 mm results in the prior art in an achievable resistance to tensile strain of 7 bar. Said value amounts to 40 bar when employing the inventive coupling device. According to the inventor this is brought about by the burr which results when punching the openings out of the plane of the grip ring.

It is preferred that the openings have a width B such that the ratio B/D is less than 3, D being the thickness of the grip ring. In this way the grip ring which is part of the coupling device according to the invention remains sufficiently strong in spite of the formation of the openings.

It is preferred that the dents approximately halfway the openings are situated maximally out of the plane of the grip ring. In this way approximately triangle-like dents are provided, burrs formed by punching of the openings and located at the edge of said dents being optimally effective in providing grip on the pipes with which the coupling device is employed.

It is further preferred that the grip ring is made of stainless spring steel having a tensile strength of at least 1200 N/mm$^2$, preferably approximately 1400–1600 N/mm$^2$. In this way the effectiveness of the grip provided according to the invention may be maximally employed because the strength characteristics inherent to such material are fully utilized by cold deformation of the material due to punching and dent-formation which increases the tensile strength.

The invention is also embodied in a method for fabricating a grip ring to be used in a coupling device according to the invention, said method being characterized in that the slit-like openings are punched and that subsequently in a forming process small dents are pressed out of the plane of the plate adjacent to the openings, followed by giving the plate an at least approximately ring-shape.

DESCRIPTION OF THE DRAWINGS

The invention will be further elucidated with the aid of the drawing in which

FIG. 2 shows the grip ring which is part of the coupling device according to the invention; and FIGS. 3 and 4 show the grip ring of FIG. 2 in cross-section A—A and B—B, respectively.

DETAILED DESCRIPTION OF THE INVENTION

Figure 1:
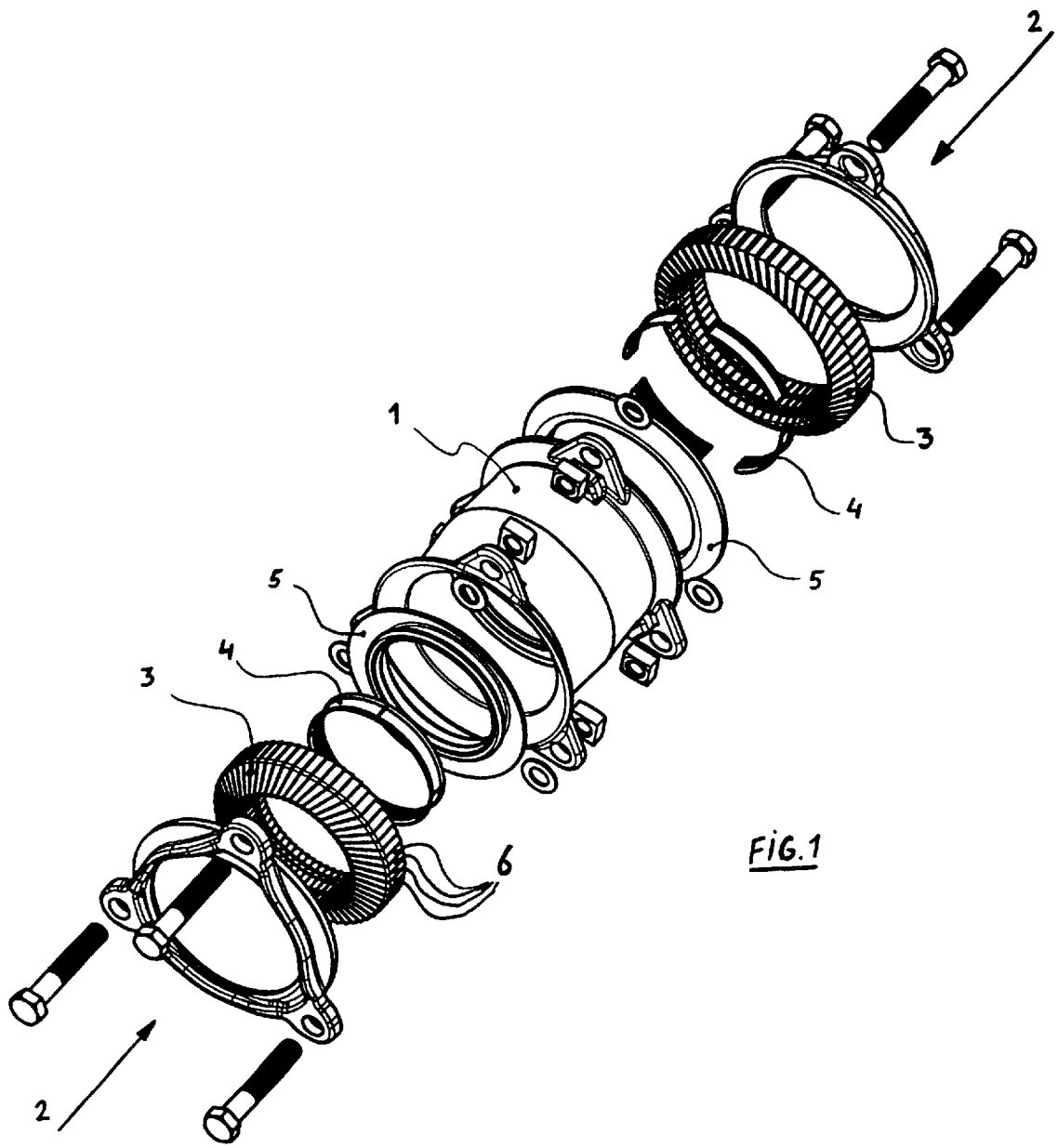
FIG. 1 shows an exploded view of the coupling device according to the invention.

Identical reference numerals used in the figures refer to like parts.

Referring to FIG. 1, the coupling device is shown in an exploded view and comprises a sleeve 1 having an insert end 2 for a pipe which is not shown, and a sealing means 3, 4, 5 adapted for realizing a seal around the pipe when inserted in the sleeve 1, said sealing means 3, 4, 5 comprising a plurality of mutually slidable elements 6 which together form a ring 3, and a grip ring 4 being mounted within said elements 6 and extending along at least a part of the perimeter of the pipe, said grip ring 4 being formed with dents pressed out of the plane of the grip ring. For a further description of the coupling device one is referred to EP-A-0 794 378 and U.S. Ser. No. 08/790,146, which has been incorporated by reference.

Referring to the FIGS. 2, 3 and 4, the configuration of the grip ring 4 is further elucidated. As stated the grip ring 4 is formed with dents 7 pressed out of the plane of the grip ring, clearly shown in top-view in FIG. 2 and in cross-section and side-view in FIGS. 3 and 4, respectively. The dents 7 pressed out of the plane of the grip ring 4 are adjacent to slit-like openings 8 punched out of the grip ring 4, shown in FIGS. 2 and 3. The openings 8 having a width B, as viewed transverse to the peripheral direction of the grip ring 4, such that the ratio B/D is less than 3, D being the thickness of the grip ring 4 as indicated in FIG. 3. In FIG. 2 it is clearly shown that the dents approximately halfway the openings 8 are positioned maximally out of the plane of the grip ring 4. This is more clearly shown in FIG. 4.

Several kinds of material may be used for fabricating the grip ring 4. Preferably the grip ring 4 is made of stainless spring steel having a tensile strength of at least 1200 N/mm$^2$ and preferably being in the range of approximately 1400–1600 N/mm$^2$. The grip ring 4 is according to the invention preferably fabricated such that slit-like openings 8 are punched in preferably a stainless steel plate, strip or band, and that next small dents 7 are pressed out of the plane of the plate adjacent to the openings 8, in a process as such known to the skilled person, followed by giving the plate an at least approximate ring shape.

What is claimed is:

1. A coupling device for a pipe, comprising a sleeve having an insert end for receiving the pipe and a sealing means adapted to form a seal around the pipe when inserted in the sleeve, said sealing means comprising a plurality of mutually slidable elements which define a ring, and a grip ring mounted within said elements and extending along at least a part of the perimeter of the pipe, wherein the grip ring is provided with dents.

2. A coupling device according to claim 1, wherein said dents are located adjacent to slit-like openings punched out of said grip ring.

3. A coupling device according to claim 2, wherein at least a portion of said dents are situated maximally out of the plane of the grip ring.

4. A coupling device according to claim 3, wherein said dents are generally triangular.

5. A method of fabricating the grip ring of claim 2, comprising punching the slit-like openings, pressing the dents out of the plane of the grip ring adjacent to the slit-like openings, and forming the grip ring generally into a ring-shape.

* * * * *

UNITED STATES PATENT AND TRADEMARK OFFICE
CERTIFICATE OF CORRECTION

PATENT NO. : 6,481,755 B2
DATED : November 19, 2002
INVENTOR(S) : Michel P. Hulsebos et al.

It is certified that error appears in the above-identified patent and that said Letters Patent is hereby corrected as shown below:

<u>Title page,</u>
Item [22], delete "3/28/01" and substitute -- 3/29/01 --.

Signed and Sealed this

Seventh Day of October, 2003

JAMES E. ROGAN
*Director of the United States Patent and Trademark Office*